(12) United States Patent
Carter

(10) Patent No.: US 7,090,450 B1
(45) Date of Patent: Aug. 15, 2006

(54) TIE DOWN AND RELEASE SHACKLE

(76) Inventor: Allen C. Carter, 5898 Antioch Rd., Adel, GA (US) 31620

( * ) Notice: Subject to any disclaimer, the term of this patent is extended or adjusted under 35 U.S.C. 154(b) by 0 days.

(21) Appl. No.: 11/128,467

(22) Filed: May 13, 2005

(51) Int. Cl.
*B61D 45/00* (2006.01)

(52) U.S. Cl. .................................... 410/103

(58) Field of Classification Search ............... 410/103, 410/101, 96
See application file for complete search history.

(56) References Cited

U.S. PATENT DOCUMENTS

| | | | |
|---|---|---|---|
| 3,589,304 A | 6/1971 | Haynes | |
| 4,234,166 A | 11/1980 | Cederblad | |
| 4,273,484 A | 6/1981 | Blanar | |
| 4,316,686 A | 2/1982 | Cottrell et al. | |
| 4,423,610 A * | 1/1984 | Hart et al. .................. | 70/18 |
| 4,699,018 A * | 10/1987 | Tagawa .................. | 74/473.13 |
| 4,735,121 A * | 4/1988 | Coulson .................. | 81/129 |
| 5,009,087 A * | 4/1991 | Long .................. | 70/49 |
| 5,101,537 A | 4/1992 | Cummings | |
| 5,109,684 A * | 5/1992 | Grandy, Sr. .................. | 70/25 |
| 5,156,506 A | 10/1992 | Bailey | |
| 5,180,262 A | 1/1993 | Westerdale | |
| 5,314,275 A | 5/1994 | Cottrell et al. | |
| 5,941,666 A | 8/1999 | Waters | |
| 6,065,374 A * | 5/2000 | Taggart .................. | 81/63.2 |
| 6,558,092 B1 | 5/2003 | Woodruff | |
| 6,719,507 B1 | 4/2004 | Botelho | |
| 2003/0082022 A1 | 5/2003 | Botelho | |
| 2004/0155230 A1 | 8/2004 | Fortin | |
| 2004/0173707 A1 | 9/2004 | Loudamy | |

* cited by examiner

*Primary Examiner*—H Gutman
(74) *Attorney, Agent, or Firm*—Langdale Vallotton, LLP; John P. Sinnott

(57) ABSTRACT

The described pawl and ratchet wheel shackle is preferably used to secure automobiles on transport trailers for shipment. To release the tension on the chain securing the vehicle on the trailer, the pawl is shifted laterally relative to the ratchet wheel's plane of rotation. This lateral shift disengages the pawl from the ratchet teeth, releasing the ratchet wheel and relieving the tension on the chain.

7 Claims, 2 Drawing Sheets

TIE DOWN AND RELEASE SHACKLE

CROSS-REFERENCES TO RELATED APPLICATIONS

None

STATEMENT REGARDING FEDERALLY SPONSORED RESEARCH OR DEVELOPMENT

None

REFERENCE TO "SEQUENCE LISTING"

None

BACKGROUND OF THE INVENTION

This invention relates to tie down and release shackles and, more particularly to a ratchet and pawl shackle for securing and releasing vehicles on an automobile transport trailer in which the pawl is shifted laterally to engage and disengage the ratchet wheel, and the like.

To load and secure vehicles for shipment on automobile transport trailers, it has been the practice to use ratchet and pawl devices. Typically, one end of a chain, a cable or the like is temporarily secured to the frame of a vehicle that is to be shipped to a new destination. The other end of the cable is attached to a shaft that also forms the rotatable axle for a ratchet wheel. Thus, as the ratchet wheel is rotated in one direction, the chain is wound on the axle and draws the vehicle to which the chain is attached onto the transport trailer. When the vehicle is drawn into its proper shipment position on the transport trailer, a pawl is pivoted about its own axis of rotation into the gap between two adjoining ratchet teeth in order to prevent the ratchet wheel and the associated axle from turning in the opposite direction and releasing the tension on the chain.

To release the chain tension and thus to permit the ratchet to turn in the opposite direction, the pawl is disengaged from the ratchet wheel by being pivoted in the opposite direction about its axis of rotation to withdraw the pawl from the gap between the two ratchet teeth.

Although this structure satisfies the need to secure vehicles on transport trailers for shipment, it has, nevertheless, several unsatisfactory characteristics. Illustratively, to pivot the pawl out of the gap between two ratchet teeth in order to unload a vehicle from a transporter, a considerable force (usually manual) must be applied to relieve the force on the pawl and pivot the pawl out of engagement with the teeth on the ratchet wheel. The force, for example, that is applied to the pawl must overcome the weight of the vehicle that is being secured, as that weight is reflected in the tension on the chain and the friction force that the chain tension applies to the ratchet wheel at the engaged end of the pawl.

The possibility of a serious injury to a person unloading the vehicle from the transporter in this circumstance is quite clear.

Further in this respect, both the axle for the ratchet wheel and the pivot for the pawl are journalled in a flanged wheel ramp channel. The biasing spring for the pawl is secured to a flange on the side of the ramp channel opposite to the ratchet wheel and the pawl. This flange also provides a bearing that journals one end of the pawl's pivot.

This structure is subject to several difficulties. First, for instance, is the complicated nature of the apparatus which increases the cost of manufacture. The pawl also has a bad characteristic of slipping out of engagement with the ratchet teeth and jamming between the ratchet wheel hub and the channel. Correcting this condition when it occurs is not only burdensome, but it also involves a further risk of personal injury.

From time to time, the biasing spring for the pawl requires replacement. The biasing spring positioned on the side of the channel opposite to the ratchet wheel and the pawl requires dismounting the entire shackle from the transportation trailer, replacement of the spring and then replacing the shackle on the trailer.

Because the pivot for the pawl is journalled both in the channel and in the flange on the opposite side of the channel, the force applied by the ratchet teeth to the pawl also imposes a bending or twisting moment to the pawl's pivot. This bending moment can cause the pawl to disengage the ratchet teeth and allow the ratchet wheel to "free wheel" and release the tie down tension on the vehicle while in transit or at some other undesirable time.

BRIEF SUMMARY OF THE INVENTION

These and other difficulties that have beset the prior art are, to a great extent, overcome through the practice of the invention.

For example, in accordance with a feature of the invention, a pawl is mounted on a spring guide in a manner that enables the pawl to be shifted laterally out of engagement with two adjoining ratchet teeth. A channel member, moreover, has two flanges spaced laterally from each other, the flat sides of the flanges being parallel with and on opposite sides of the ratchet wheel's plane of rotation. The spring guide for the pawl is mounted in the gap between the opposing flat sides of the flanges and perpendicular to the ratchet wheel plane of rotation. A biasing spring on the spring guide, moreover, presses the pawl into alignment with the ratchet wheel's plane of rotation.

Thus, by pressing the pawl against the biasing spring force, the pawl will disengage the ratchet wheel teeth and release the tension on the chain that holds the vehicle on the transport trailer. This structure enables the pawl to disengage and release the ratchet wheel without the application of force that characterized prior shackles and which made those shackles so potentially dangerous to the transport truckers.

The arrangement of the flanges that form the channel also provides for improved use in that the flanges, being parallel with and on opposite sides of the ratchet wheel's plane of rotation also solves several prior art problems. Illustratively, the force applied by the ratchet wheel to the pawl that is mounted on the spring guide between the two flanges that straddle the plane of ratchet wheel rotation is sustained equally by the two flanges that support the spring guide. In this way, there is no eccentric loading on the spring guide, nor is the spring guide subjected to the bending or twisting moment that caused prior art pawls to slip out of engagement with the teeth on the ratchet wheel and to accidentally release the transport trailer's chain tension or to jam between the ratchet wheel hub and the channel.

The structure that characterizes the present invention also in considerably less complicated than prior art shackles thereby decreasing cost of manufacture. Shackle maintenance is also simplified. Biasing spring replacement, for instance, does not require the entire shackle to be dismounted from the trailer, but only requires the spring guide to be withdrawn from its mounting in the two flanges. The old spring is removed, a new spring is placed on the spring guide along with the end of the pawl that is opposite to the end that engages the ratchet teeth as the assembly is being remounted in the flanges.

Accordingly, a safer, more reliable and less expensive transport trailer shackle is provided through the practice of the invention. For a more complete appreciation of the invention, attention is invited to the following detailed description of a preferred embodiment of the invention when taken with the figures of the drawing. The scope of the invention, however, is limited only by the claims appended hereto.

DETAILED DESCRIPTION OF PREFERRED EMBODIMENT OF THE INVENTION

Figure 1:
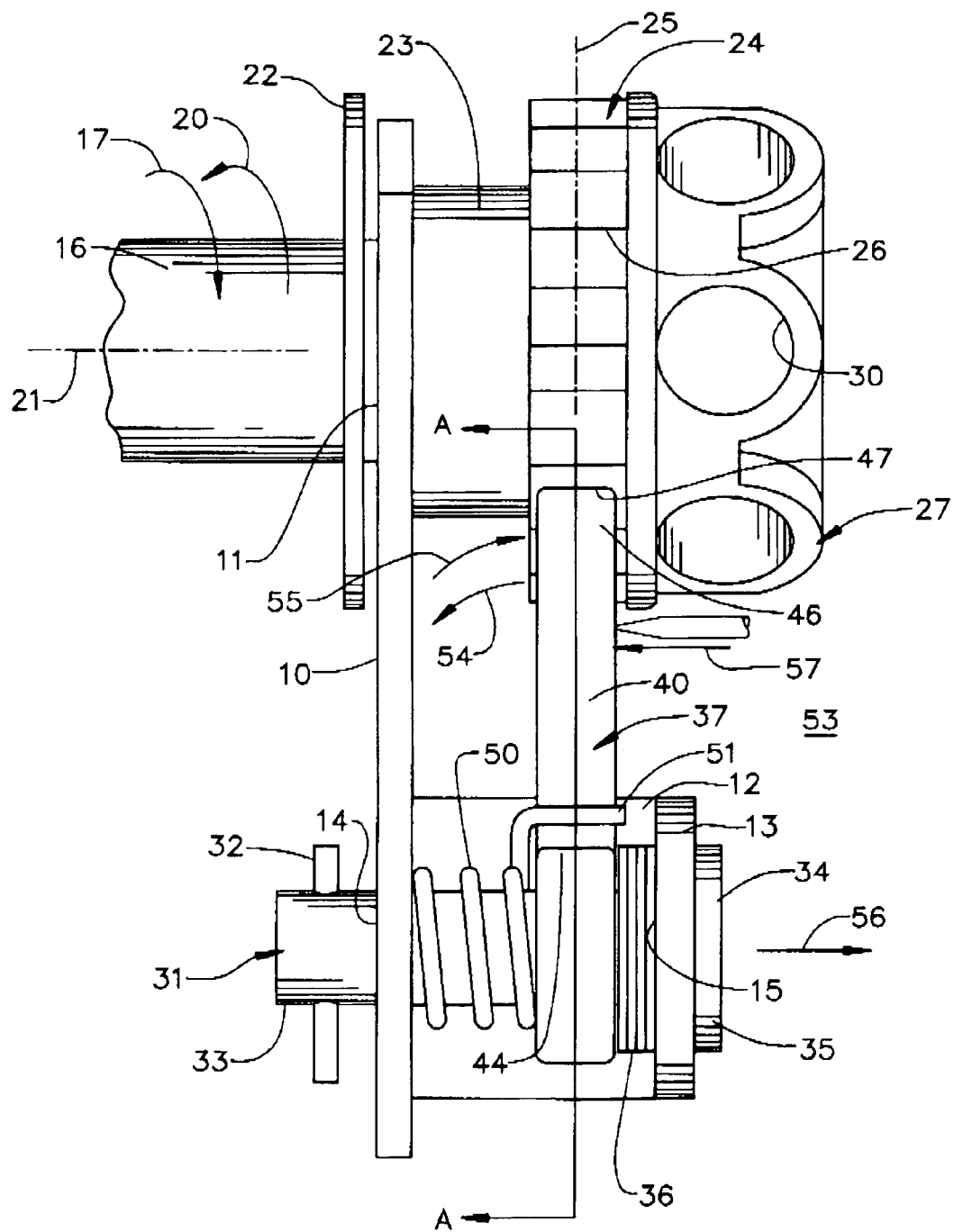
FIG. 1 is a plan view of a shackle that characterizes features of the invention.

As best illustrated in FIG. 1 a generally rectangular channel flange 10 has a bore, or ratchet wheel bearing 11 formed in an end of the flange 10. At the opposite end of the flange 10 a support member 12 protrudes perpendicularly from the bottom of the flange 10. A spring guide flange 13 is mounted on the support member 12 and is spaced from the adjacent surface of the flange 10. Aligned bores or spring guide journals 14, 15 are formed in the flanges 10 and 13, respectively.

Rotatably supported in the ratchet wheel bearing 11 is a ratchet wheel axle 16. The axle 16 is rotatable in clockwise and counter-clockwise directions as shown by arrows 17 and 20 respectively about axis 21 for the axle 16. As illustrated in the drawing, the ratchet wheel axle 16 protrudes through the channel flange 10 and is secured by means of a keeper 22 on one side of the flange 11 and a bushing 23 on the support member 12 side of the flange 10.

A ratchet wheel 24 is secured to the axle 16 for rotation with the axle 16. In accordance with a salient feature of the invention, the ratchet wheel 24 establishes a plane of rotation 25 between the channel flange 10 and the spring guide flange 13. Teeth 26 on the ratchet wheel 24, moreover, are essentially bisected by the rotation plane 25.

On the extreme end of the ratchet wheel axle 16 a handle engaging portion 27 is provided to enable a handle (not shown in the drawing) to be inserted into the portion 27 through pairs of diametrically aligned apertures of which only apertures 30 are shown in the drawing.

A generally cylindrical spring guide 31 is mounted in the aligned spring guide journals 14, 15. The spring guide 31 is secured to the channel flange 10 on the side of the ratchet wheel axle keeper 22 by a cotter pin 32 that is received in a bore (not shown in the drawing) formed in the portion 33 of the spring guide 31 that protrudes from the same side of the channel flange 10 as the ratchet wheel keeper 22. Opposite end 34 for the spring guide 31 has a boss 35 that holds the spring guide snugly against the spring guide flange 13 in a manner described below in more detail.

Shims 36, of which ordinary washers are suitable, are mounted on the spring guide 31 to bear against a pawl 37 and establish longitudinal alignment of center plane 40 for the pawl 37 with the ratchet wheel plane of rotation 25.

Figure 2:
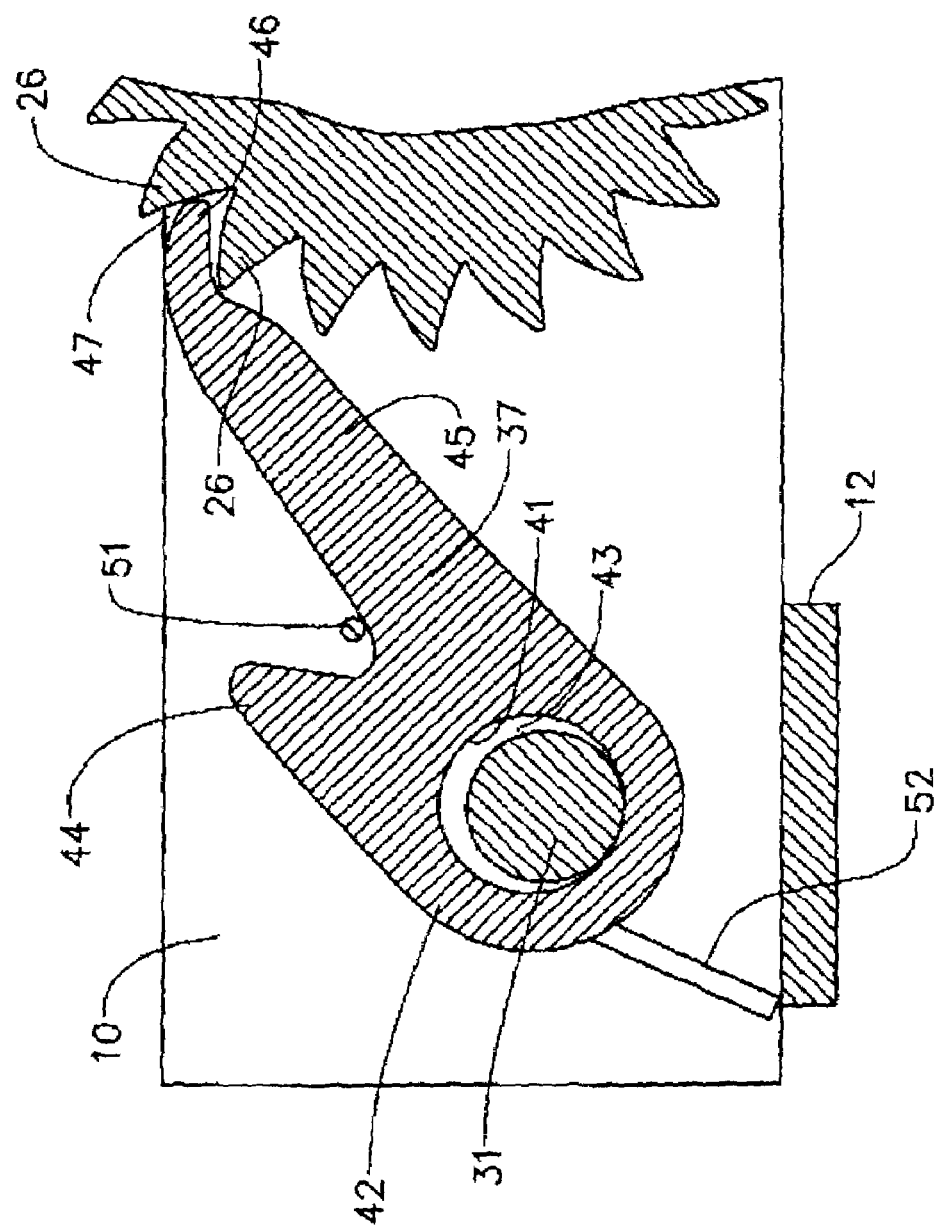
FIG. 2 is a side elevation of a portion of the shackle shown in FIG. 1, taken along the line A—A of FIG. 1 and viewed in the direction of the arrows.

Attention is invited to FIG. 2 which shows the pawl 37 having an opening or a pawl bore 41 formed in mounting end 42. As shown, the spring guide 31 is received in the pawl bore 41. As illustrated, however, the diameter of the pawl bore 41 is slightly greater than the corresponding diameter of the spring guide 31 to establish, in accordance with another salient feature of the invention, means for selectively shifting a pawl tip 46 into and out of alignment with the ratchet wheel plane of rotation 25 (FIG. 1). Illustratively, a crescent shaped gap 43 (FIG. 2) is formed between the pawl bore 41 and the corresponding outer surface of the spring guide 31 that allows a force applied, to the pawl 37 in a direction generally transverse to the plane of ratchet wheel rotation (FIG. 1) to shift the pawl 37 laterally and thus to temporarily misalign the pawl's center plane 40 with the ratchet wheel rotation plane 25 and enable the pawl tip 46 to clear the ratchet teeth.

A protruding spring keeper 44 (FIG. 2) also is provided in the mounting end 42 of the pawl 37. A further protruding and teeth engaging member 45 of the pawl 37 extends from the mounting end 42 of the pawl 37 to the pawl tip 46 that selectively nests in a gap 47 between adjoining sets of the ratchet teeth 26.

Returning to FIG. 1, a spiral biasing spring 50, mounted on the spring guide 31 is interposed between a side of the mounting end 42 of the pawl 37 and the channel flange 10. As shown, the spring 50 also has an end 51 that extends across the base of the spring keeper 44 in a direction that is perpendicular to the center plane 40 of the pawl 37. Another end 52 (FIG. 2) for the biasing spring 50 is braced against the support member 12. In this manner the transverse pressure applied by the biasing spring 50 (FIG. 1) on one side of the pawl 37 and the shims 36 on the other side of the pawl 37 maintain the center plane 40 of the pawl 37 in generally coincident alignment with the ratchet wheel plane of rotation 25. In this manner two features of the invention are enabled. The force applied by the ratchet teeth 26 through the pawl tip 46 to the spring guide 31 is balanced between the bearings 14, 15 in the channel flange 10 and in the spring guide flange 13. In this way, application of eccentric bending or twisting moments to the spring guide are avoided, thereby not only reducing the undesirable potential for slippage between the pawl and the ratchet teeth in which the pawl otherwise might jam between the ratchet wheel and the channel flange, but also to possibly disengage the ratchet wheel teeth and allow the ratchet wheel to "free wheel" under the tension applied to the ratchet wheel axle.

In operation, one end of the handle (not shown in the drawing) is inserted into the diametrically aligned apertures 30 in the handle engaging portion 27 of shackle 53. The handle engaging portion 27 then is rotated in the counter-clockwise direction of the arrow 20 in order to wind a chain (also not shown in the drawing) around the ratchet wheel axle 16. During this counter-clockwise turning of the ratchet wheel 24, the pawl tip 46 (FIG. 2) is not engaged in the gap 47 between adjoining sets of the teeth 26, but rides over the surfaces of the gear teeth 26. In this manner, when a vehicle for stowage on a transport trailer (also not shown in the drawing) is loaded onto the trailer for shipment with an appropriate tension established between the chain and the axle 16 for safe shipment, the handle (not shown) is withdrawn from the handle engaging portion 27.

Once the rotation of the ratchet wheel 24 has stopped and the handle removed, the ratchet wheel 24 turns a few degrees back, in the clockwise direction shown by the arrow 17 until the pawl tip 46 (FIG. 2) slips into a nested position in the gap 47 between the adjoining pair of the ratchet teeth 26. In this way, the tension established between the chain and the axle 16 is transferred to the ratchet wheel teeth 26 that then lock the pawl tip 46 in the gap 47.

To release the tension on the chain and to permit the ratchet wheel 24 (FIG. 1) to "free wheel" in the clockwise direction of the arrow 17, it is only necessary to press the tip 46 of the pawl 37 transversely or laterally in the direction of arrow 54 and out of the plane of the ratchet wheel rotation 25 by means of the working end of a screw driver or the like pressed in the direction of arrow 57. The pawl tip 46, being subject only to the friction force between the tip 46 and the surfaces of the teeth 26 that bear against the tip 46, does not require an application of very great force to accomplish this disengagement of the pawl 37 from the ratchet wheel 24 through the shift in the direction of the arrow 54. Attention is particularly invited in this instance to FIG. 2 and the crescent shaped gap 43 between the pawl bore 41 and the adjoining outer surface of the spring guide 31 that enables the pawl 37 to be shifted laterally out of the ratchet wheel plane of rotation 25 and thereby disengaging the pawl tip 46 from contact with the ratchet teeth 26.

Once the tension is released on the ratchet wheel axle, the pawl tip 46 will shift under the pressure applied by the biasing spring 50 in the direction of arrow 55 to enable the pawl tip to reengage in appropriate gap 47 formed by the teeth 26.

In accordance with another feature of the invention, replacement of the biasing spring 50 is simplified relative to prior art shackles. Accordingly, to replace the biasing spring 50, the cotter pin 32 is withdrawn from its bore (not shown) in the spring guide portion 33. The spring guide 31 is then drawn out of the bearing 14, in the flange 10 in the direction of arrow 56. The old biasing spring 50 is removed from the spring guide 31 and discarded. The new biasing spring 50 is placed on the spring guide 31 and the spring guide portion 33 then is pressed through the bearing 14 in the flange 10 to protrude from the channel flange 10 on the side of the keeper 22. The cotter pin 32 is reinserted in its bore in the portion 33 and the free ends of the cotter pin 32 are spread a few degrees to lock the cotter pin 32 and the spring guide 31 in place with the center plane 40 of the pawl 37 essentially coincident with the ratchet wheel plane of rotation 25.

Thus, there is provided in accordance the foregoing features of the invention a significantly improved ratchet and pawl shackle. Although the shackle is particularly useful in connection with vehicle transport trailers, it is also quite suitable for use wherever a safe, reliable and inexpensive ratchet and pawl shackle is needed.

What is claimed is:

1. A shackle comprising a ratchet wheel having a plurality of pairs of adjoining ratchet teeth establishing a plane of rotation, said pairs of teeth forming gaps therebetween, a pawl is in selective alignment with said ratchet wheel rotation plane, said pawl having a tip for nesting in said gaps to engage and disengage said ratchet teeth, and means for selectively shifting relative to the shackle only said pawl to transversely pivot out of and into alignment with said plane of ratchet wheel rotation.

2. A shackle comprising a ratchet wheel having a plurality of pairs of adjoining ratchet teeth establishing a plane of rotation, said pairs of teeth forming gaps therebetween, a pawl is in selective alignment with said ratchet wheel rotation plane, said pawl having a tip for nesting in said gaps to engage and disengage said ratchet teeth, means for selectively shifting said pawl tip out of and into said plane of ratchet wheel rotation, wherein said pawl has an opening formed therein, a guide received in said pawl opening, said guide and said pawl opening forming a gap therebetween to provide said means for selectively shifting said pawl into and out of said plane of ratchet wheel rotation.

3. A shackle according to claim 2 further comprising a biasing spring on said guide for generally aligning said pawl tip with said ratchet wheel rotation plane.

4. A shackle for a transport trailer comprising a channel flange, a spring guide flange spaced from said channel flange, a ratchet wheel axle protruding through one side of said channel flange, a ratchet wheel on the other side of said channel flange, said ratchet wheel axle being journalled in said channel flange to establish a plane of rotation between said channel flange and said spring guide flange for said ratchet wheel, a plurality of pairs of adjoining teeth on said ratchet wheel, said teeth pairs forming gaps therebetween, a pawl having a center plane in general alignment with said ratchet wheel plane of rotation for selective nesting in said gaps between said ratchet teeth, said pawl having a bore formed in one end thereof, a spring guide mounted in said channel flange and said spring guide flange and generally perpendicular to said ratchet wheel plane of rotation, said spring guide being seated in said pawl bore and forming a gap between said bore and said spring guide to enable said pawl to selectively shift transversely out of and into said general alignment with said plane of ratchet wheel rotation to disengage and engage said pawl in said gaps between said ratchet teeth.

5. A shackle according to claim 4 further comprising a biasing spring on said spring guide.

6. A shackle according to claim 4 further comprising a cotter pin in said spring guide to enable said spring guide to be withdrawn and inserted into said channel flange.

7. A shackle according to claim 5 further comprising at least one shim on said spring guide to generally align said pawl center plane with said ratchet wheel plane of rotation.

* * * * *